Oct. 24, 1933.  A. W. DICKEY  1,931,789
SPEED COUNTING STROBOSCOPE
Filed Sept. 16, 1929  2 Sheets-Sheet 1
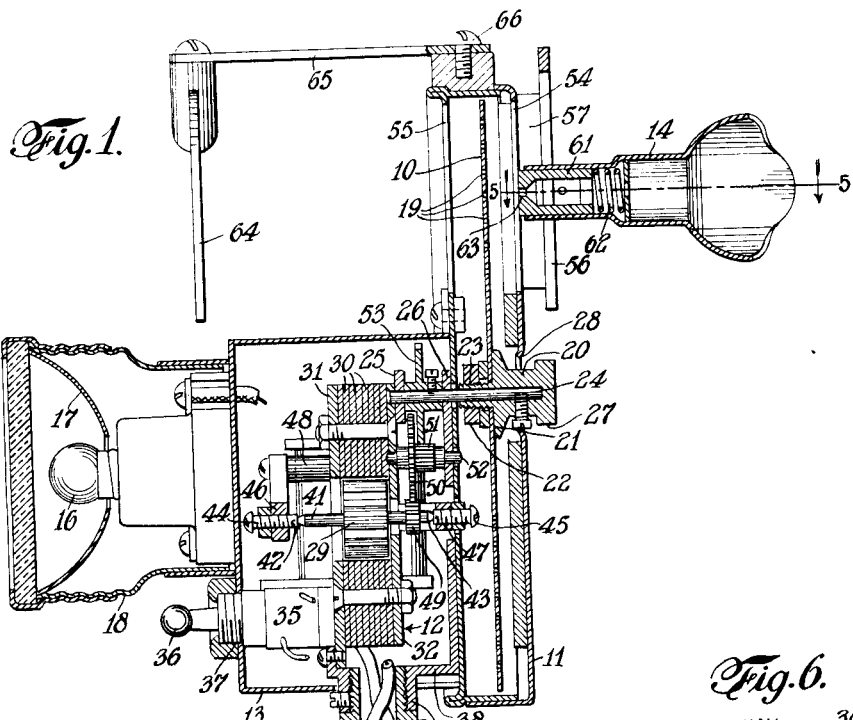
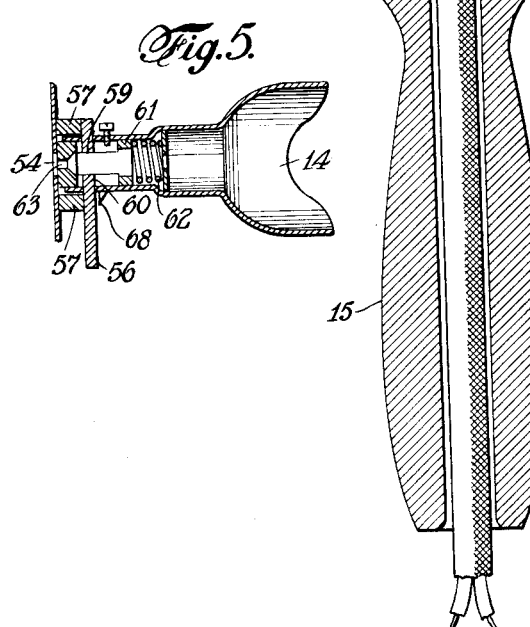
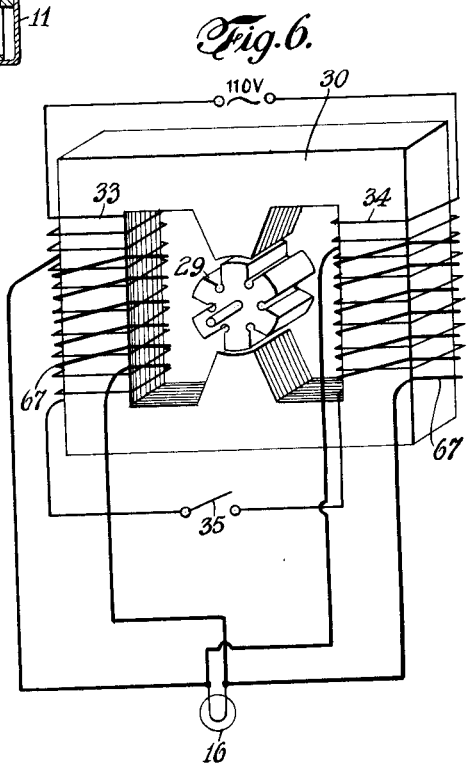
INVENTOR
ALBERT W. DICKEY
BY
Eugene C. Brown
ATTORNEY Oct. 24, 1933.  A. W. DICKEY  1,931,789
SPEED COUNTING STROBOSCOPE
Filed Sept. 16, 1929   2 Sheets-Sheet 2
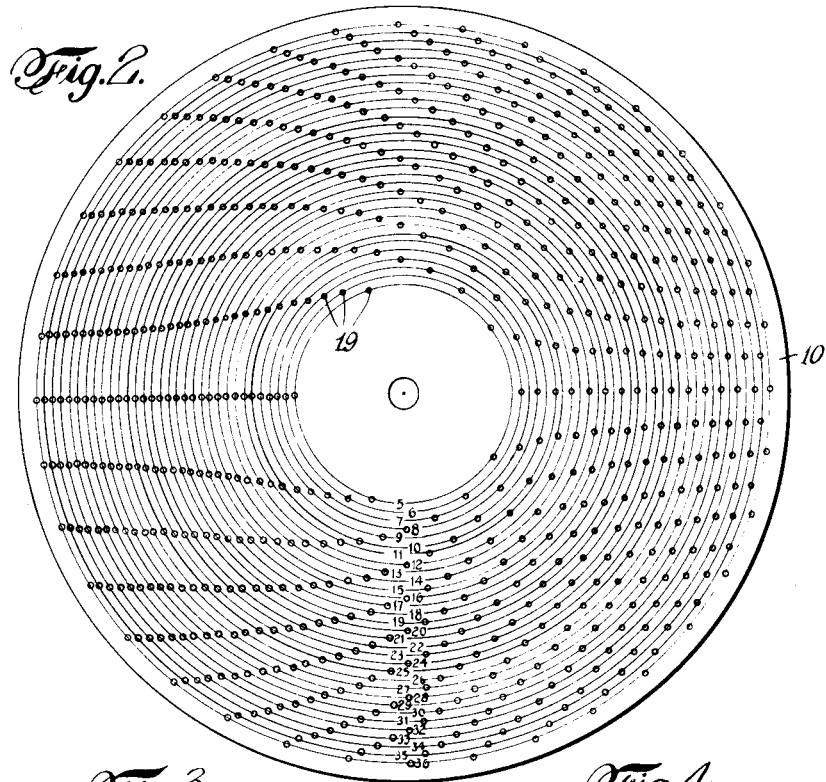
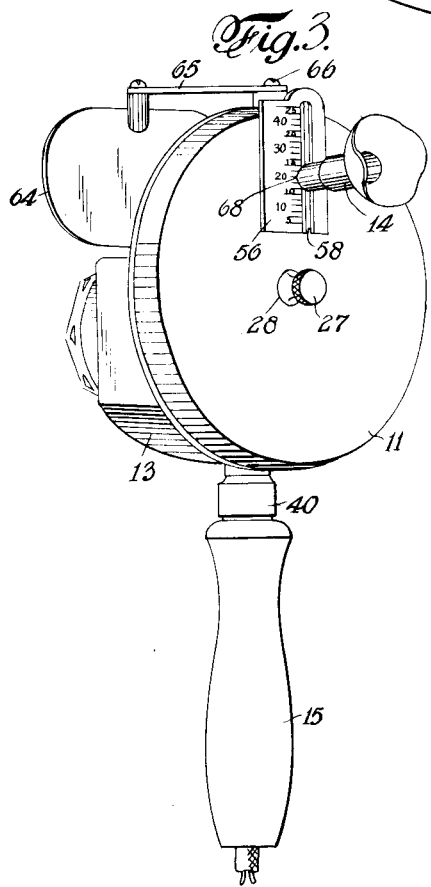
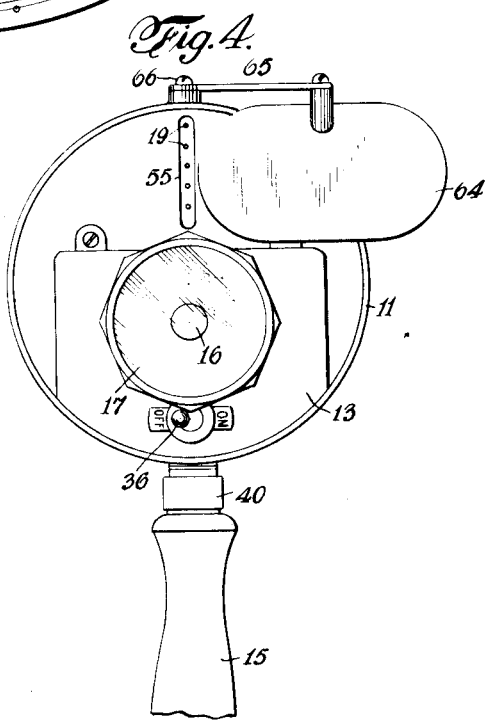
INVENTOR
ALBERT W. DICKEY
BY Eugene C. Brown
ATTORNEY Patented Oct. 24, 1933

1,931,789

UNITED STATES PATENT OFFICE 1,931,789

SPEED-COUNTING STROBOSCOPE

Albert W. Dickey, Mount Vernon, N. Y., assignor to The Western Union Telegraph Company, New York, N. Y., a corporation of New York Application September 16, 1929
Serial No. 393,053

7 Claims. (Cl. 88—14)

This invention relates to apparatus for determining the rate or cyclic frequency of periodic motion and more particularly to a stroboscope for observing vibratory or rotary motion and determining the rate thereof.

The stroboscope as commonly understood, comprises an arrangement for causing a body having periodic movement to appear at rest or to have a slow period of movement by interrupting the vision either by intermittently illuminating the object at uniform time intervals or by periodically cutting off the line of vision, as by observing the moving body through moving apertures. The present invention is concerned with a stroboscopic device of the latter type.

One of the objects of the invention is to provide an instrument with which speeds of rotating objects or rates of vibration of oscillating objects can be determined without any mechanical or electrical connection with the object.

Another object is to provide a portable stroboscope of the moving aperture type, of small dimensions which may be conveniently held in hand and which will provide a means of making speed determinations over a wide range.

Another object is to produce a stroboscopic device the rotating element of which operates at a fixed constant speed independent of the speed or frequency of the object being observed.

A further object is to produce an electrically driven stroboscope which is light, compact and simple in construction.

Other objects and advantages will hereinafter appear.

In accordance with my invention I provide a vision interrupting disk having a multitude of concentrically arranged circular rows of apertures of small area, the number of apertures in each row differing in accordance with a definite plan. The disk is rotated at a constant speed by an electric motor and means is provided for isolating each individual circular row of apertures for observation therethrough. Preferably I provide a central row of apertures with a small number of openings increasing the number of openings in each succeeding outer row by one, although it is to be understood that the number of apertures in each succeeding row may increase by any desired number of openings and may vary over different portions of the disk, depending upon the accuracy required and the range of speed to be measured. I have found, with a disk rotating at approximately 100 R. P. M. that the diameter of the aperture may be made quite small, i. e., satisfactory vision can be obtained, of a well illuminated object, through an aperture having a diameter of .07 inches or even less. A disk having a diameter of about 5 inches will readily accommodate thirty or more distinct rows of openings of this size and will permit accurate speed determinations to be made from 100 R. P. M. to 6,000 R. P. M. or more.

In order that the invention may be more fully understood reference will be had to the accompanying drawings in which:

Fig. 1 is a vertical sectional view through a stroboscopic device embodying my invention;

Fig. 2 is a plan view of the vision interrupting disk;

Fig. 3 is a front perspective view of the device;

Fig. 4 is a rear elevation thereof;

Fig. 5 is a sectional view of the eye piece for isolating a desired row of apertures, the section being taken on the line 5—5 of Figure 1; and Fig. 6 is a diagrammatic illustration of the operating motor showing the relative arrangement of the field windings and a secondary winding utilized for supplying low voltage current for operating an electric lamp to illuminate the object being observed.

Referring to Figure 1, my stroboscopic device comprises a vision interrupting disk 10 contained within a suitable cylindrical casing 11, an electric motor 12 for driving the disk at a uniform speed contained within a casing 13 secured to the casing 11, an eye piece 14 for isolating any desired row of apertures of the disk, a handle 15 and a source of illumination for the object to be observed comprising an electric lamp 16 mounted within a reflector 17 contained within a housing 18 secured to the casing 13.

The disk 10 which may consist of any suitable light, thin, strong opaque material such as cardboard, bakelite, metal etc., has a large number of concentric circular rows of apertures 19 the apertures in each row being spaced equally apart and the number of apertures increasing by one in each succeeding outer row. The rows of apertures are indicated by miniature numerals 5 to 36 respectively, corresponding to the number of apertures in each row of the particular disk illustrated. The disk 10 is mounted upon a hub 20, being clamped between a shoulder 21 thereon and a clamping nut 22 on the threaded shank 23 thereof. The hub 20 is rigidly secured on a shaft 24 disposed axially of the casing 11 and bearing in a plate 25 and a bracket 26 carried by the motor 12. The hub 20 has a knurled head 27 projecting through a central opening 28 in the front face of the casing 11 so that it may be rolled between the thumb and forefinger to bring the disk up to operating speed. This is required only in case a non-self starting synchronous motor is used. However, in order to eliminate "slip" between the rotor and the field of the motor, I prefer to employ a non-self starting motor.

The motor 12 which, as stated above is of the synchronous type, is preferably operable from a 60 cycle, 110 volt circuit. The motor comprises a soft iron armature or rotor 29 having six poles and the usual field core laminations clamped between brass faces 31 and 32. As shown diagrammatically in Figure 6, the field winding comprises two spaced coils 33 and 34 disposed in series on the opposite arms of the field core.

A motor controlling switch 35, which may be of the toggle type, is mounted upon the motor, the operating lever 36 thereof extending through an opening 37 in the casing 13. The motor is mounted upon a bracket 38 having a collar 39 by which it is secured to a threaded ferrule 40 provided on the handle 15. Current is supplied to the motor by conductors extending through the handle.

The shaft 41 of the rotor 29 has conical bearings 42 and 43 bearing in the ends of adjustable screws 44 and 45, respectively, threaded through bridge members 46 and 47 mounted upon posts 48 and extending across the rotor opening.

The disk 10 is driven from the motor 12 through reduction gearing comprising a gear 49 on the rotor shaft, gears 50 and 51 mounted on a shaft 52 and a gear 53 secured to the shaft 24, of the disk 10. The gear ratio is preferable such as to cause the disk 10 to rotate accurately at 100 R. P. M.

Narrow aligned vertical slots 54 and 55 are provided in the front and rear faces of the casing 11, the eye piece 14 being mounted opposite the slot 54 in such manner that it may be moved along the slot to permit the object under observation to be viewed through any one of the concentric rows of apertures in the disk 10 to the exclusion of the others.

On the front of the casing 11 opposite the slot 54 is mounted an eye piece guide and support consisting of a plate 56 carried by two spaced strips 57 so as to space the plate from the front of the casing. The plate 56 has a vertical slot 58 aligned with the slots 54 and 55. The tubular body of the eye piece 14 has a vertical guideway 59 in each side thereof in which the sides 60, defining the slot 58, engage to permit the eye piece to be moved along the slot. A friction plunger 61 contained within the eye piece and pressed against the front face of the casing 11 by a coiled spring 62 holds the eye piece in any desired position along the slot 58. A small opening 63 is provided in the plunger to permit a clear sight to be obtained through the slots 54 and 55 and through a single row of openings in the disk 10. By moving the eye piece along the slot 58 any desired circular row of openings can be isolated from the remaining rows and the object under observation viewed therethrough.

The plate 56 may be graduated in number of holes per circular row, or in hundreds of R. P. M. and also in cycles per second. The eye piece has an index 68 which moves over the graduations of the plate.

A blinder 64, mounted on an arm 65 pivoted at 66 to the top of the casing 11, may be swung into position at either side of the eye piece to obstruct the vision from the eye not being used.

The lamp 16 is preferably a low voltage lamp of the ordinary flashlight type and is supplied with low voltage current by a secondary winding 67 disposed about the primary coils 33 and 34 of the motor 12 as shown in Figure 6.

The operation of the device is as follows:

The motor 12 is brought up to speed by rolling the knurled knob 27 between the thumb and forefinger. The object to be observed is then viewed through the eye piece 14. The eye piece is moved along its guideway to such position that the object being viewed appears to stand at rest or to have the slowest apparent movement. The reading of the eye piece scale will then give the speed of movement of the body to the nearest hundredths of revolutions. The exact speed can be determined by counting the apparent revolutions per minute and adding to or subtracting it from the eye piece reading, depending upon whether the apparent movement is in a forward or rearward direction.

Assuming for instance, that the object to be viewed is a mark on a revolving wheel rotating at some definite speed, say 2100 R. P. M., if the disk is rotated at 100 R. P. M. and the eye piece adjusted so that the wheel may be viewed through the row of apertures having 21 openings therein the wheel will appear to stand still since the mark thereon will be in the same position each time it becomes visible through one of the apertures of the disk. If the wheel is speeded up to 2130 R. P. M. it will appear to have a rotation in a forward direction of 30 R. P. M. or if viewed through the 22 aperture row to have a backward rotation of 70 R. P. M. The exact speed of rotation between 2100 and 2200 R. P. M. can thus be determined by viewing the wheel through either the 21 or 22 aperture row and counting the apparent revolutions per minute either forward or backward and adding the count to or subtracting it from the speed indicated by the particular row of apertures opposite the eye piece. If the exact speed is not required it is easy to estimate within 25 R. P. M. of the correct speed by viewing the object first through the 21 aperture row and then through the 22 aperture row. At speeds of 2000 R. P. M. and upwards the possible error from estimating without actually counting is from 1.25% downwards.

If the speed of the mark to be measured had been 4135 R. P. M. the eye piece would still have been set opposite the 21 hole circle but the mark would have appeared dimmer since it would have crossed the aperture in one half the time. This dimness is an indication that the eye piece reading must be multiplied by two. The procedure would be to set the eye piece in the position which produces the slowest apparent rotation that is opposite the 21 aperture row, multiply the reading by two, count the apparent revolutions, which would be in a backward direction, and subtract this from the quotient. Thus (2100×2−65=4135 R. P. M.)

In the case of a disk having a minimum of 5 holes, for measuring speeds of less than 500 R. P. M. the determination is made by dividing the speed given by the eye piece by the number of marks which appear on the object. Thus, suppose the speed is 320 R. P. M., the eye piece would be set opposite 600 R. P. M. and two marks would appear directly opposite to each other. They would drift in the direction of rotation at the rate of 20 R. P. M. so that the exact speed would be 600÷2 plus 20=320 R. P. M. If the eye piece had been placed at 900 R. P. M., three marks would have appeared at 120 degree spacings but they would still drift around at 20 R. P. M., so that the exact speed would be 900÷3 plus 20=320 R. P. M.

It is apparent therefore that since speed measurements may be made below the normal range of the device by noting the number of positions in which the mark appears and above the normal range by the difference in intensity of illumination of the mark, a device of small dimensions will permit the periodic movement of a body to be studied over a wide range of speeds and the exact speed to be determined.

In the case of vibratory motion, suppose a pendulum or a tuning fork is vibrating at 30 cycles per second. If it is observed through the eye piece when set opposite the 1800 R. P. M. mark or the scale, it will appear to be at rest at some particular position in its swing, depending upon the relative phase between it and the stroboscope. If its rate had been 35 cycles per second, the eye piece would have been moved opposite the 2100 R. P. M. mark.

It is thus possible to determine directly, frequencies in steps of 1.66 cycles from 8.3 to 60 cycles per second with the disk shown in Figure 2. Where higher frequency determinations are to be made, the disk may be rotated at a higher speed. This can be done by changing the gear ratio or the number of poles of the armature, or both.

I am aware that the invention may be embodied in other specific forms without departing from the spirit or essential attributes thereof and therefore desire the present embodiment to be considered in all respects as illustrative and not restrictive, reference being had to the appended claims rather than to the foregoing description to indicate the scope of the invention.

What is claimed is:—

1. A stroboscope comprising a vision interrupting disc having a plurality of concentric circular rows of apertures therein, means for rotating said disc at a constant speed, a casing for said disc, a radial slot in one face of said casing, an eye piece mounted on said casing and movable along said slot for isolating a desired row of apertures from the remaining rows for observation therethrough.

2. A stroboscope comprising a vision interrupting disc having a plurality of concentric circular rows of apertures therein, the number of apertures differing in each row, means for rotating said disc at a uniform speed, a casing for said disc, aligned radial slots in the rear and front faces of said casing, a guideway on the front of said casing opposite said radial slots and an eye piece movable in said guideway for isolating a desired row of apertures for observation therethrough.

3. A stroboscope comprising a vision interrupting disc having a plurality of concentric circular rows of apertures therein, the number of apertures differing in each row, means for rotating said disc at a uniform speed, a casing for said disc, a radial slot in one face of said casing, a guideway on the casing opposite said radial slot, an eye piece movable in said guideway for isolating a desired row of apertures for observation therethrough, a scale for indicating the speed of the object under observation and a pointer actuated by said eye piece and movable over said scale.

4. A stroboscope comprising a disc having a plurality of closely spaced concentric circular rows of apertures, the number of apertures in each succeeding outer row increasing by a definite number over that of the preceding row, the maximum dimensions of each of said apertures radially of the disc being not more than about .1 inches, means for rotating said disk at a constant speed, an eye piece, means for supporting said eye piece opposite any desired row of apertures and means for excluding extraneous light from said eye piece and permitting light to be received thereby only through one of said rows of apertures.

5. A portable stroboscope comprising a handle adapted to be held in the hand, a casing mounted on said handle, a vision interrupting disc in said casing having a plurality of circular rows of closely spaced apertures, means for isolating a desired row of apertures from the remainder for vision therethrough and a constant speed electric motor also within said casing for rotating said disc.

6. A portable stroboscope comprising a handle adapted to be held in the hand, a casing mounted on said handle, a vision interrupting disc in said casing having a plurality of circular rows of closely spaced apertures, means for isolating a desired row of apertures from the remainder for vision therethrough, a constant speed electric motor also within said casing for rotating said disc, said motor having a field winding, a light projecting device on said casing and a coil inductively related to said field winding for supplying current to said light projecting device.

7. A stroboscopic device comprising a vision interrupting element, an electric motor having field coils for rotating said element, a light projecting device for illuminating the object under observation and a secondary winding on said field coil for supplying low voltage current to said light projecting device.

ALBERT W. DICKEY.